Sept. 18, 1951 E. M. KELLY ET AL 2,568,452
CLARIFICATION
Filed May 31, 1949
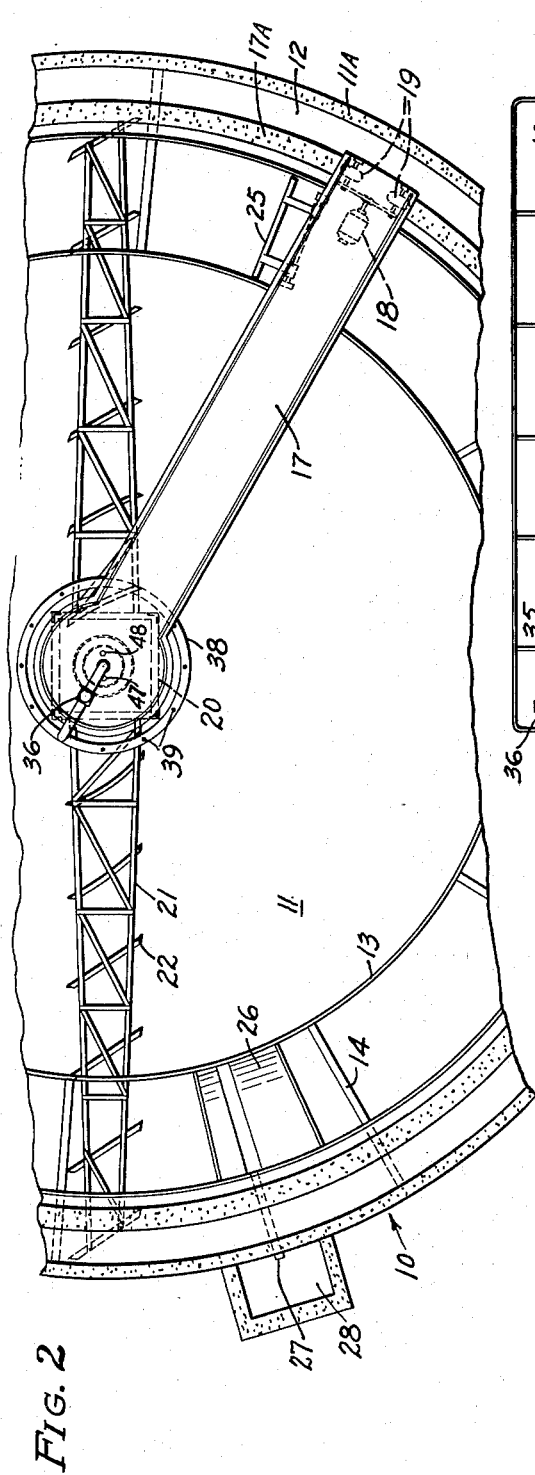
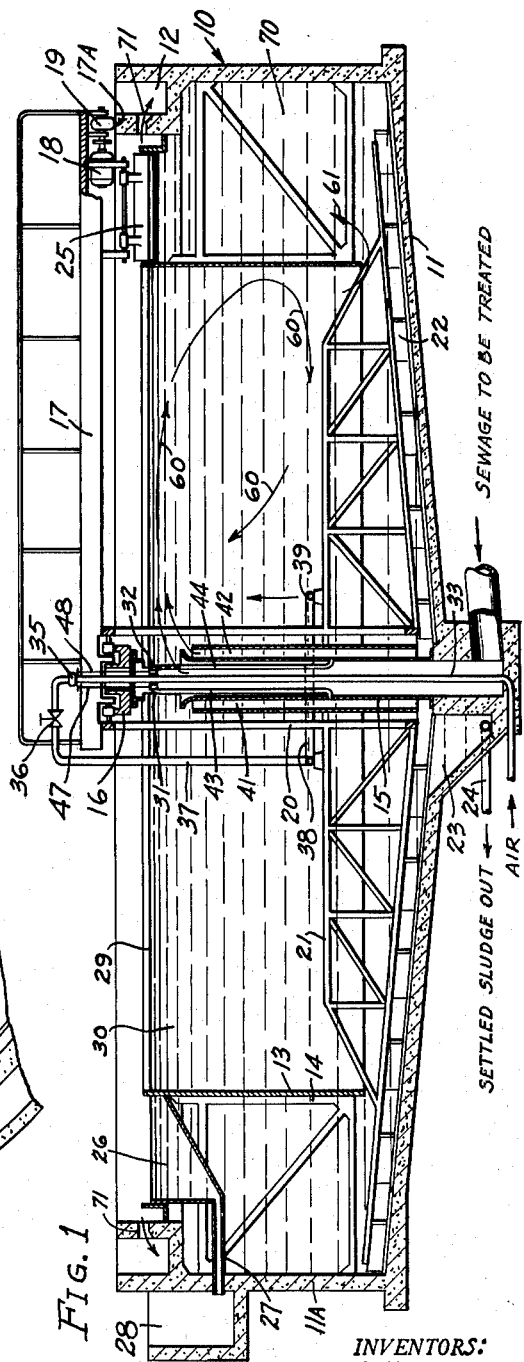
INVENTORS:
EARL M. KELLY,
ARTHUR M. KIVARI,
BY
*James B. Christie*
ATTORNEY.

Patented Sept. 18, 1951

2,568,452

UNITED STATES PATENT OFFICE 2,568,452

CLARIFICATION

Earl M. Kelly, Millbrae, and Arthur M. Kivari, Los Angeles, Calif., assignors to Process Engineers Incorporated, San Francisco, Calif., a corporation of California Application May 31, 1949, Serial No. 96,184

12 Claims. (Cl. 210—5)

This invention is concerned with clarification and provides improvements in methods and apparatus for clarification, i. e. the settlement of finely divided solids from suspensions in liquid.

Clarification ordinarily is conducted by introducing the suspension to be clarified into a tank in which the solids are settled out, the clarified liquid being removed at an overflow and the settled solids being raked to and removed from a central discharge point at the bottom of the tank. Such apparatus is satisfactory in many instances, but it is always advantageous to obtain as large a throughput as possible. In many instances, settlement is influenced by flocculation or agglomeration of the finely divided solids in the original suspension, thus increasing settlement and it has been suggested that the settling rate and the clarifier capacity can both be increased by returning some of the settled sludge into the upper portion of the clarifier tank to provide nuclei to which more finely divided solids may be attached, for example, by agglomeration or adsorption.

As a result of our investigations we have discovered that the rate of settlement or clarification can be increased by circulating both settled and partially settled solids in the clarifier tank in contact with incoming feed and with air. This discovery is applicable to the clarification of water supplies, sewage treatment, and to the clarification of liquids containing chemical precipitates, such for example, as those produced in the lime-soda process of water softening. Accordingly, our invention contemplates, in a clarification operation involving settlement of finely divided solids suspended in a liquid body, the improvement which comprises continuously lifting settled solids mixed with air from a lower portion of the body adjacent to the point of removal of the settled solids and the discharge of this mixture into the upper portion of the body, continuously lifting partially settled solids from an intermediate level in the body to said upper portion of the body and continuously introducing fresh feed into the upper portion of the body. In this fashion, the fresh feed is circulated in contact with both partially suspended settled solids and completely settled solids, the effect being to increase the rate of clarification or settlement.

The reasons for the improved results are not completely understood, but it is believed that the partially settled solids provide more favorable nuclei for agglomeration or adsorption of some of the material in the fresh feed, while the more or less completely settled solids provide more favorable nuclei for the consolidation of other solids in the feed.

It is desirable to establish in the body a concurrent circulation of the feed, the aerated settled solids, and the aerated partially settled solids.

Preferably the fresh feed is introduced into the same upper portion of the body into which the circulated settled solids and the partially settled solids are introduced.

In a clarifier comprising a tank for retaining a pool of liquid in which clarification takes place, an upper peripheral discharge means for clarified liquid from the tank, a lower discharge means for settled solids, and means for moving settled solids to the lower discharge means along the bottom of the tank, our invention contemplates the combination which comprises means for continuously introducing a suspension of finely divided solids in liquid to be clarified into an upper portion of the tank, an airlift for lifting settled solids from a point adjacent the lower discharge means to a point in the upper portion of the tank and there discharging the settled solids into the pool, and means for blowing air into the tank at an intermediate level for raising partially settled solids into the upper portion of the tank into which the settled solids are discharged by the airlift. Preferably the apparatus of the invention is provided with means for adjusting the ratio of settled and partially settled solids that are lifted and recirculated, because we have found that for many cases there is an optimum ratio which, when attained, gives optimum clarification conditions.

In the preferred form of the apparatus of the invention a center column is provided. The material to be clarified is fed through or into this column. A plurality of duct-type airlifts for settled sludge are disposed vertically around this center column, with a separate control for the rate of lift or circulation of each duct. In addition, the apparatus is provided with an air ring which introduces air around the center column at an intermediate level in the pool. This air causes partially settled solids to be aerated and lifted toward the surface and circulated in contact with the returned settled sludge and the fresh feed. Preferably means should be provided for controlling the amount of air admitted at the intermediate level, thus controlling the rate of return or recirculation of the partially settled solids.

These and other aspects of the invention will be understood more clearly in the light of the following detailed description taken in conjunction with the accompanying drawings in which:

Fig. 1 is a sectional elevation of a clarifier incorporating the elements of the invention and adapted for sewage treatment; and Fig. 2 is a partial plan view of the apparatus of Fig. 1.

The apparatus illustrated comprises a conventional round tank 10 of concrete or the like, having a gently sloping inverted conical bottom 11 and a vertical wall 11A. A conventional annular overflow launder 12 is provided at the top periphery of the tank to receive clarified liquid. A vertical annular baffle 13 of steel plate or the like is disposed vertically in the tank about a third of the way in from the wall and is held in position by a steel skeleton framework 14 which is fastened to the inside of the wall of the tank.

The apparatus has a central column or hollow shaft 15 which rises vertically and supports a turntable 16 at its top. A drive truss 17 rests and rotates on the turntable and extends to a track 17A on the inside wall of the overflow launder. The drive truss rests on drive wheels 19 which in turn rest on the track. The wheels are driven in conventional fashion by a motor 18 mounted on the underside of the drive truss.

A skeleton framework 20 is rigidly fastened to the drive truss and extends downwardly around the central shaft of the apparatus. It carries a conventional rigidly mounted rake structure 21 at its lower end so that the rakes 22 thereof are rotated slowly around the bottom of the tank to move settled solids to a sludge pocket 23 adjacent the center of the clarifier. Sludge is withdrawn from the pocket through a pipe 24.

A conventional scum scrapper 25 is fastened to the drive truss between the overflow launder and the annular baffle. The scum scrapper carries scum from the surface of the liquid in the outer tank annulus and discharges it into a scum box 26 of conventional type disposed between the annular baffle and the outside of the tank. The scum box is drained through a pipe 27 into an outside launder or tank 28.

Fresh sewage to be treated is introduced into the bottom of the apparatus and rises through the hollow center shaft where it escapes just below the liquid level 29 into the pool 30. The fresh sewage passes out of the central shaft through four equal ports at the same elevation. Two of the ports 31, 32 are shown in Fig. 1. Air under pressure is introduced through a vertical airline 33 that rises in the center of the column, i. e. on the axis of the apparatus, and passes through the turntable to a swivel joint 35. Above the swivel joint the line is bent outward at right angles and has an adjustable valve 36. Beyond the valve a portion 37 of the airline drops vertically to and is connected with a ring of airpipe 38 which rests on the raking mechanism. This air ring has perforations 39 around its upper surface.

The apparatus is provided with four vertical airlifts, of which two 41, 42 are shown in Fig. 1. The airlifts are stationary vertical pipes that extend from a level just above the sludge pit to a level just below the discharge of fresh sewage into the pool and are fastened to the outside of the central column. Air for the lifts is supplied by four separate pipes (of which two 43, 44 appear in Fig. 1) which extend from the central air pipe 33 down to a level about midway of the airlifts. Each of the lines to the airlifts is provided with separate valves (47, 48 on Fig. 1) for control of air to the individual lifts.

The operation of the apparatus just described is as follows:

The sewage to be treated is forced under pressure up the central column and radially out through the four ports near the top of the column into the pool maintained in the clarifier. Solids in the sewage tend to settle out in the pool. Some of the solids drop to the bottom of the tank and are moved by the rake mechanism toward and into the sludge pit. Some of the settled solids are raised by the airlifts and discharged radially into the upper central zone of the pool to mix and circulate with the fresh sewage. In addition, partially settled solids are forced upward from an intermediate level in the pool by the air emitted by the air ring, so that in the upper central zone of the pool there is an admixture of freshly introduced sewage, settled sludge that has been aerated and returned, and partially settled sludge that has been aerated and returned. The effect of the airlifts and the air ring is to set up a circulation in a radial plane from top to bottom of the clarifier (see the arrows 60 in Fig. 1). Liquid (see the arrow 61 in Fig. 1) passes underneath the annular baffle 13 which drops down so that it just clears the rake mechanism and thence passes upward in the outer annular section 70. Scum rising in this outer annular section is dragged off by the scum scraper into the scum box. Clarified liquid rising in the outer annular section passes through a plurality of ports 71 into the peripheral launder of the clarifier and thence is discharged.

It should be emphasized that the central shaft or column of the clarifier is stationary and that the air lifts disposed on the outside thereof are likewise stationary.

The air ring 38 revolves with the rake structure around the swivel joint.

By adjusting the relative amount of air sent to the air ring and to the airlifts by means of the respective control valves the proportion of recirculated completely settled solids and recirculated partially settled solids can be varied at will to suit the particular material being clarified.

The structure illustrated in Figs. 1 and 2 is adapted for tanks of 40 feet or more in diameter. For smaller tanks it is preferable to support the rake structure and the aerating means from beams extending crosswise of the tank in conventional manner.

The feed preferably is introduced below the liquid level in the central portion of the pool as shown in Fig. 1, but it may be introduced at any point in the pool within the baffle. Thus the feed may be introduced by a pipe passing through the side of the tank and the baffle or coming into the tank from above.

By controlling the air sent to the perforated air ring and to the airlift, the rate of circulation of the settled sludge and the partially settled sludge can be adjusted with respect to each other and with respect to the rate of introduction of fresh sewage.

Conditions for coagulation and settling are particularly advantageous in the apparatus of the vention due to the fact that settled sludge, partially settled slude and raw feed rise at the center of the clarifier and are aerated near the liquid surface, i. e. near the surface of the pool. Morever, coagulation is aided by exposure of the rising stream to the air at the pool surface.

As indicated above, the invention has been described in detail with reference to sewage treatment, but both the process and apparatus are applicable to a great variety of clarification problems including the removal of chemical precipitates from mother liquors, etc.

We claim:

1. In clarification involving the flocculation and settlement of finely divided solids suspended in a body of liquid with continuous removal of the clarified liquid from an upper portion of the body, removal of suspended solids from a lower portion of the body, and continuous introduction of feed to the body, the improvement which comprises continuously and separately lifting settled solids mixed with air from the lower portion of the body adjacent the point of removal and discharging the mixture into an upper portion of the body, continuously lifting partially settled solids with air from an intermediate level in the body to said upper portion of the body, and continuously discharging fresh feed into an upper portion of the body remote from the region from which the clarified liquid is withdrawn.

2. In clarification involving the flocculation and settlement of finely divided solids suspended in a body of liquid with continuous removal of the clarified liquid from an upper portion of the body, removal of suspended solids from a lower portion of the body, and continuous introduction of feed to the body, the improvement which comprises continuously and separately lifting settled solids mixed with air from the lower portion of the body adjacent the point of removal and discharging the mixture into an upper portion of the body, continuously lifting partially settled solids with air from an intermediate level in the body to said upper portion of the body, continuously discharging fresh feed into an upper portion of the body in the neighborhood in which the mixture is discharged, and establishing in the body a concurrent circulation of the feed, the aerated settled solids and the aerated partially settled solids.

3. In clarification involving the flocculation and settlement of finely divided solids suspended in a body of liquid with continuous removal of the clarified liquid from an upper portion of the body, removal of suspended solids from a lower portion of the body, and continuous introduction of feed to the body, the improvement which comprises continuously and separately lifting settled solids mixed with air from the lower portion of the body adjacent the point of removal and discharging the mixture into a central upper portion of the body, continuously lifting partially settled solids with air from an intermediate level in the body to said central upper portion of the body, and continuously discharging fresh feed into said central upper portion of the body in the neighborhood in which the mixture is discharged.

4. In a clarifier comprising a tank having an upper peripheral discharge means for clarified liquid, a lower discharge means for settled solids, and means for moving settled solids to the lower discharge means along the bottom of the tank, the combination which comprises feed means for continuously introducing a suspension of finely divided solids in liquid to be clarified into an upper portion of the tank remote from the peripheral discharge means for clarified liquid, an airlift separate from the feed means for raising settled solids from a point adjacent the lower discharge means to a point in said upper portion of the tank closely adjacent the paint of discharge from said feed means and there discharging it, and separate means for blowing air into the tank at an intermediate level for raising partially settled solids into said upper portion of the tank into which the settled solids are discharged by the airlift.

5. In a clarifier comprising a tank having an upper peripheral discharge means for clarified liquid, a lower discharge means for settled solids, and means for moving settled solids to the lower discharge means along the bottom of the tank, the combination which comprises feed means for continuously introducing a suspension of finely divided solids in liquid to be clarified into an upper portion of the tank remote from the peripheral discharge means, an airlift separate from the feed means for raising settled solids from a point adjacent the lower discharge means to said upper portion of the tank closely adjacent the point of discharge from said feed means and there discharging it, and separate means for blowing air into the tank below said upper portion at an intermediate level for raising partially settled solids into said upper portion of the tank.

6. In a clarifier comprising a tank having an upper peripheral discharge means for clarified liquid, a central lower discharge means for settled solids, and means for moving settled solids to the central lower discharge means along the bottom of the tank, the combination which comprises feed means for continuously introducing a suspension of finely divided solids in liquid to be clarified into an upper inner portion of the tank, at least one airlift separate from the feed means and disposed upright adjacent the center of the tank for raising settled solids from a point adjacent the lower discharge means to a central upper portion of the tank closely adjacent the point of introduction of the feed and there discharging it, and a aeration means disposed around the airlift for blowing air into the tank at an intermediate level for raising partially settled solids into the central upper portion of the tank.

7. Apparatus according to claim 6 in which the airlift is stationary and means are provided for rotating the aeration means around it.

8. Apparatus according to claim 6 in which the airlift is provided with a separate control valve for the amount of air introduced into it.

9. Apparatus according to claim 6 having a separate valve for controlling the amount of air admitted to the aeration means.

10. Apparatus according to claim 6 in which a valve is provided for separately controlling the amount of air admitted to the airlift, and another valve is provided for separately controlling the amount of air admitted to the aeration means.

11. In a clarifier comprising a tank adapted to contain a pool of liquid from which finely divided solids are settled, an upper peripheral discharge means for the clarified liquid, a lower central discharge means for the settled solids, and means for moving the settled solids along the tank bottom to the central discharge means, the combination which comprises an airlift for raising settled solids admixed with air and liquid from a point adjacent the central discharge means and projecting the mixture toward the tank side into an upper central zone in the pool, means for blowing air into the pool at a point intermediate the central discharge means and the upper central zone to cause partially settled solids to be carried up into the zone, means for introducing feed into said upper central zone and projecting the same toward the tank side, and means for adjusting the relative quantities of air introduced into the airlift and through the air blowing means.

12. In a clarifier comprising a tank adapted to contain a pool of liquid having its upper surface in contact with the atmosphere and from which finely divided solids are settled, an upper peripheral discharge means for the clarified liquid, a lower central discharge means for the settled solids, and means for moving the settled solids along the tank bottom to the central discharge means, the combination which comprises at least one airlift for raising settled solids admixed with air and liquid from a point adjacent the central discharge means and introducing the mixture into an upper central zone in the pool near the surface, means separate from the airlift for continuously introducing a suspension of finely divided solids in liquid to be clarified into said upper central zone means for blowing air into the pool at a point intermediate the central discharge means and the upper central zone to cause partially settled solids to be carried up into the zone, and means for adjusting the ratio of the air introduced through the airlift and the air introduced through the air blowing means.

EARL M. KELLY.
ARTHUR M. KIVARI.

REFERENCES CITED

The following references are of record in the file of this patent:

UNITED STATES PATENTS

| Number | Name | Date |
|---|---|---|
| 830,552 | Zeigler | Sept. 11, 1906 |
| 2,078,266 | Morehead | Apr. 27, 1937 |
| 2,126,288 | Streander | Aug. 9, 1938 |
| 2,144,385 | Nordell | Jan. 17, 1939 |
| 2,223,257 | Mallory | Nov. 26, 1940 |
| 2,370,356 | Kamp et al. | Feb. 27, 1945 |
| 2,370,974 | Langdon | Mar. 6, 1945 |
| 2,400,598 | Prager | May 21, 1946 |
| 2,404,223 | Durdin | July 16, 1946 |
| 2,411,390 | Prager | Nov. 19, 1946 |
| 2,477,459 | Kelly | July 26, 1949 |
| 2,492,486 | Kivari et al. | Dec. 27, 1949 |
| 2,506,927 | Kelly | May 9, 1950 |